Sept. 24, 1946.  C. R. HANNA ET AL  2,407,982
ACCELERATION-RESPONSIVE GOVERNOR SYSTEM
Filed Sept. 15, 1943  3 Sheets-Sheet 3
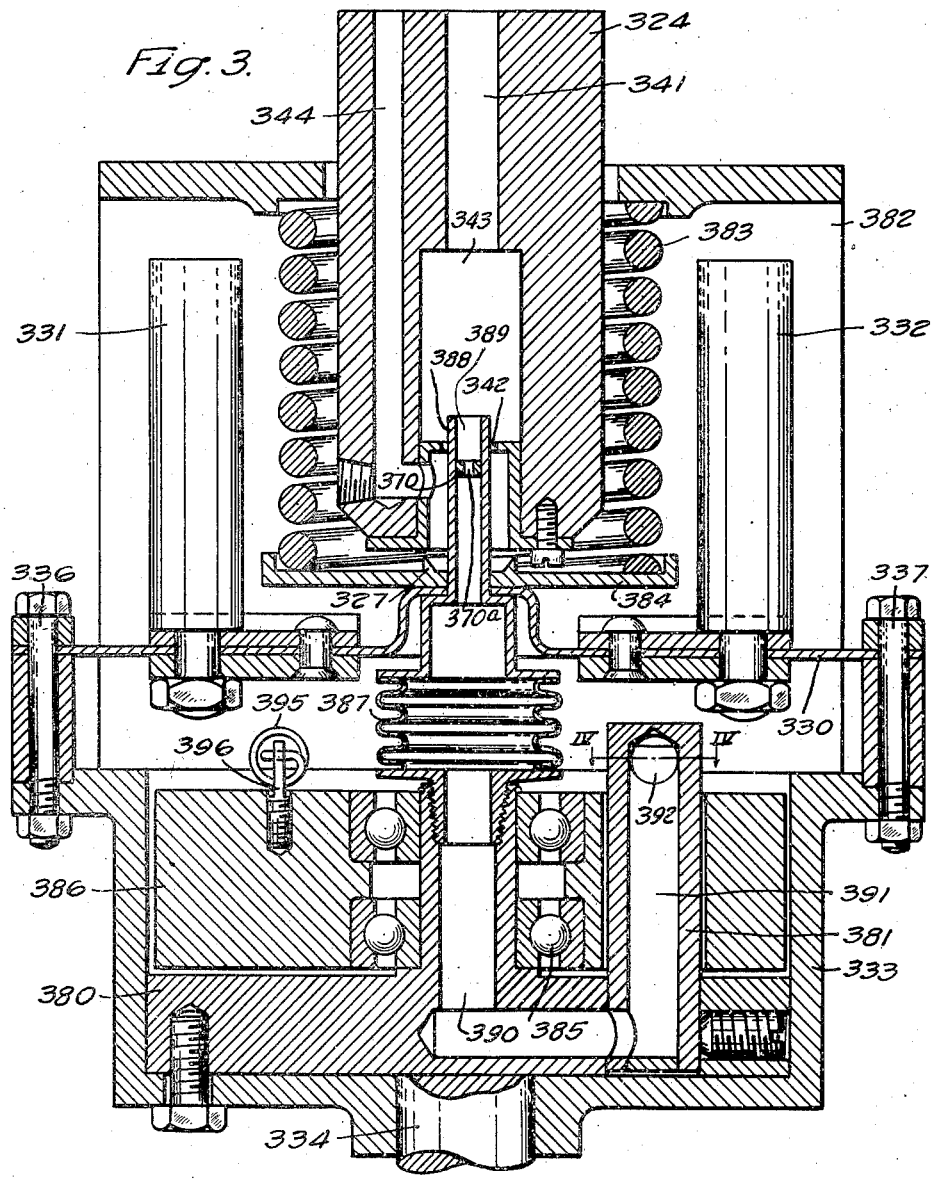
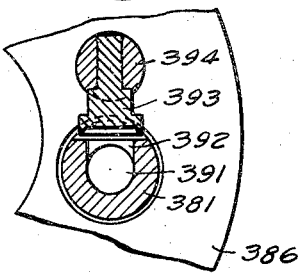
WITNESSES:
E. A. McCloskey.
Curt M. Avery
INVENTORS
Clinton R. Hanna and
Stanley J. Mikina.
BY Paul E. Friedemann
ATTORNEY Patented Sept. 24, 1946

2,407,982

UNITED STATES PATENT OFFICE 2,407,982

ACCELERATION-RESPONSIVE GOVERNOR SYSTEM

Clinton R. Hanna, Pittsburgh, and Stanley J. Mikina, Wilkinsburg, Pa., assignors to Westinghouse Electric Corporation, East Pittsburgh, Pa., a corporation of Pennsylvania Application September 15, 1943, Serial No. 502,490

1 Claim. (Cl. 264—7)

This invention relates to speed governors for prime movers such as steam turbines.

The governing means for prime movers function as a rule by control means which are responsive to the speed of the regulated machine and affect the operation of the supply valve of the prime mover either by direct actuation or through power amplifiers, such as hydraulic relays and servomotors, with the effect of maintaining the speed of the prime mover substantially constant, allowing only a small percentage of change in speed over the rated load range of the unit. In larger machines the forces required for moving the valves are too great to be supplied by direct actuation from the speed-sensitive member of the governor; hence, hydraulic servomotors are generally used. In all cases, there is a time interval between the changes in speed and the corrective engine torque due to the time delays in the governing system.

For instance, in governing systems for turbines, in which a centrifugal speed governor controls the oil pressure in a hydraulic conduit system connected to a servomotor for adjusting the turbine admission valve, the governor action as well as the action of the servomotor involve delays caused by the inertia of the masses to be displaced and the stiffness or resistance to motion of the springs as well as by the inherent friction of the movable elements required in such control systems. The magnitude of these delays will be appreciated from some specific examples: In a turbine governor of the sleeve-valve type where the oil pressure controlled by the valve is applied to the pressure transformer bellows of a follow-up mechanism of the servomotor, a change in volume of the transformer bellows occurs with each change in oil pressure. Hence, the pressure change accompanying a displacement of the sleeve valve will be delayed by a time depending on the rate at which oil can be supplied to the bellows during the transition between the initial pressure and the final pressure corresponding to the new position of the sleeve valve. In a case where the sleeve valve required only a displacement of .005" to cover a pressure range of 15 to 45 pounds per square inch, the time delay was found to vary from 0.25 to 0.60 second. This delay is rather high for cases where a high accuracy of speed control is required. Moreover, a large time lag between valve displacement and oil pressure gives rise to a large force component on the valve in phase with the valve velocity. A chattering vibration of the valve along its axis can thus be excited and maintained. As mentioned, the time delay increases with decreasing rate of oil flow through the sleeve valve. For example, in the above-exemplified case, with the valve in its middle position and at a pressure of 50 lbs./in. sq., the oil flow from a supply of 100 lbs./in. sq. was only 1 to ½ gallon per minute. However, such a low oil supply is inherent in all sleeve valves with the usual small clearance. Hence, the particular advantage of this type valve, namely to require a very small valve displacement, is nullified by the drawback of a long time delay in cases where a stable operation is an essential requirement.

With governor sleeve valves of large valve displacement, or when using cup-type governor valves requiring as a rule a similarly large displacement, the oil flow through the valve is increased and the time delay accordingly reduced. However, the delay remains as a rule within the order of 0.1 second which is still appreciable under exacting stability requirements, especially in view of the fact that an additional time delay is incurred in the servomotor actuating device of the prime mover control valve.

The delay in the hydraulic servomotor is determined by the time which the operating piston requires for moving from one position to another following a change of pressure in the servomotor pilot valve and follow-up bellows. The follow-up mechanism of the pilot valve is as a rule subject to the action of a spring, and affected by the stiffness of the follow-up bellows. The effect of these elastic impedances is to increase the time delay. In the above-mentioned example case, the servomotor delays between no load and full load and with different adjustments of the return spring of the follow-up mechanism were found to vary between 0.094 sec. and 0.077 sec. To be sure, the delay values will be different with different machines and load conditions. However, the above figures will serve to illustrate the order of magnitude of the delays here involved.

The effect of this inherent dilatory action in the speed control of prime movers is to limit the accuracy of regulation that can be attained without incurring instability in the form of periodic hunting of the system. In particular, when it is desired to regulate a prime mover with extremely little speed deviation tolerance, as is desirable, for instance in phase control systems as described in the copending application, Patent No. 2,383,306, granted August 21, 1945, to C. R. Hanna and W. O. Osbon, on "Phase-responsive governor systems," it is difficult to maintain a high accuracy of control if there is too much lag between the initiation of the corrective stimulus and the final adjustment of a corrective engine torque.

Based on the foregoing consideration, it is an object of our invention to reduce the effects of the time delay inherent in the control operation of speed governors of prime movers, i. e., to accelerate the response of the control system to changes in the prime mover speed.

Another object of the invention, also in view of the foregoing, is to provide a hydraulic control system for prime movers which affords a considerably higher accuracy and stability of speed control than obtainable in the known systems of this kind.

The invention also aims at affording, in speed governors of the type here referred to, a wider range of design and adjustment as to the type and displacement of the governor-controlled valve or pressure transformer, and to permit a wider range of applicable rates of oil flow through the valve than heretofore practicable.

A more particular object, subordinate to the one just mentioned, is to apply governor valves of small displacement and a correspondingly low rate of flow of the hydraulic fluid without incurring the disturbances and inaccuracies heretofore apt to occur due to the increased time constant under such operating conditions.

A further object of our invention is to reduce or substantially eliminate the hunting tendency of hydraulic speed control systems for prime movers, as well as the tendency to develop vibrations in the governor-controlled valve mechanism especially at low load operation.

Referring especially to the application of a governor system for controlling the angular phase position of the prime mover rotor with respect to a rotating reference, as described in the aforementioned copending application, it is a still further object to improve the accuracy of control to such an extent as to achieve a stability comparable with that required for the frequency control of electrical generators so that a prime mover generator set thus controlled is, in fact, capable of affording a satisfactory frequency regulation and stabilization of the electric output current.

Another object of our invention is to provide means which when added to governor systems of customary type afford an improvement of the system as to its velocity of response to speed variations of the prime mover. Correlated objects involve the provision of control means in addition to the centrifugal type governor heretofore employed as to improve these governors in accordance with the above-stated objects while requiring relatively little change in the general setup and construction of the system.

In order to achieve these and other objects, and in accordance with this invention, we provide the control system for actuating the admission valve of a prime mover with acceleration responsive control means. More in particular, we equip the hydraulic governor and servomotor of such a system with pressure-controlling means which vary the pressure transmitted by the system to the servo-motor device in dependence upon the time rate of change in the prime mover speed.

In one aspect of our invention, an accelerator functioning in the manner of a pressure transformer is arranged in the hydraulic transmission system and contains a movable member in cooperation with pressure orifices for augmenting the effect of a pressure variation in response to changes in the hydraulic pressure itself.

In other aspects, the invention requires the use of inertia-controlled devices, such as flywheels, in mechanical association with a drive member operating at prime-mover speed so that a relative displacement between the drive member and the inertia-controlled mass of the device due to changes in prime-mover speed is utilized for opening and closing a valve of the hydraulic control system.

According to another feature of our invention, means are disposed in the governor system of a prime mover which are responsive to the angular acceleration of the prime mover as well as to its speed and angular position. Since changes in speed are preceded by the development of angular acceleration, the corrective stimulus is initiated before any appreciable change in speed occurs and hence compensates for the subsequent delay of the corrective torques otherwise caused by the governor time delays.

These and other objects, advantages, and features of the invention will be apparent from the following description of the embodiments illustrated in the drawings, in which:

Fig. 3 represents a different embodiment by an axial section through the centrifugal speed governor of a prime mover control system designed in accordance with the invention; and Fig. 4 shows a detail of the same governor in a section along the cut IV—IV indicated in Fig. 3.

Figure 1:
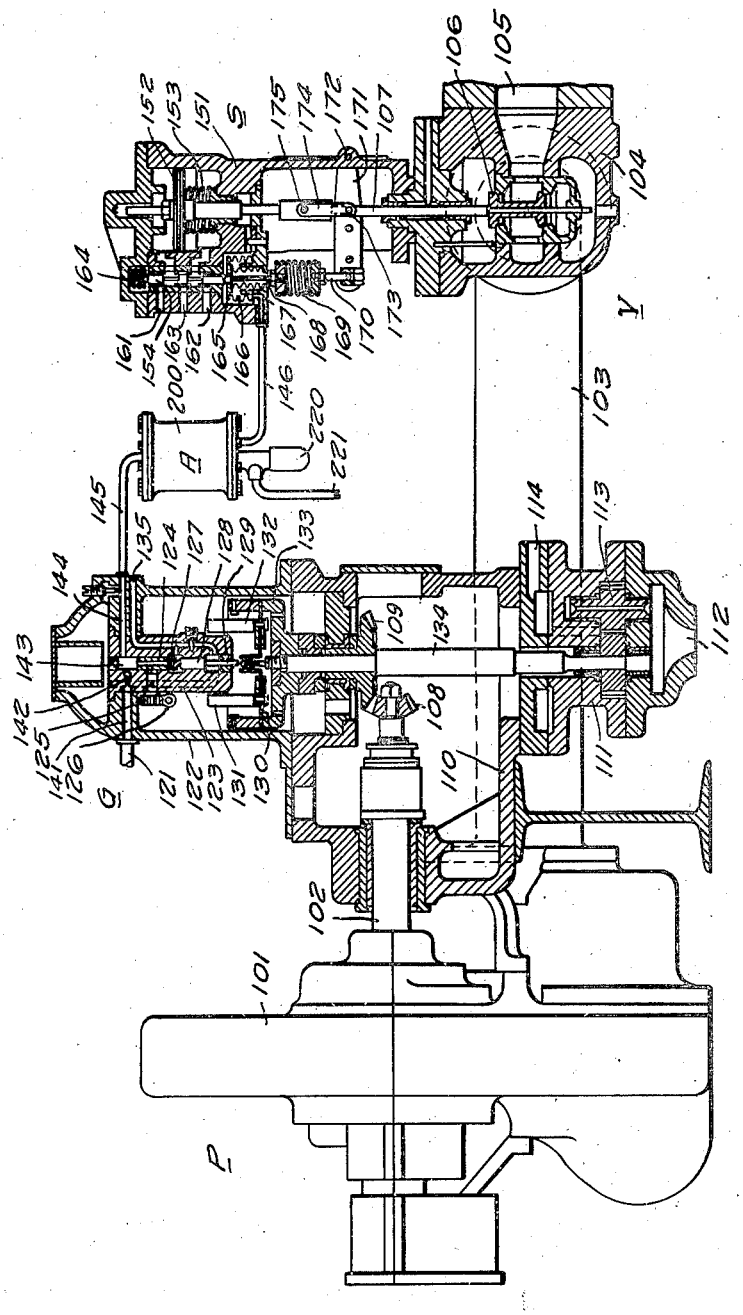
Figure 1 is a diagrammatic showing of a steam turbine in conjunction with a servo-motor speed control system according to the invention, some of the control devices being illustrated in section.

Referring to Fig. 1, the prime mover to be controlled is arranged at P, the speed governor at G, the servomotor controlled by the speed governor at S, and the admission valve actuated by the servomotor is located at V. The acceleration responsive control apparatus provided in accordance with the invention is placed at A between the speed governor G and the servomotor S. It is as a rule preferable and customary to arrange the speed governor and servomotor of such a control system close together, for instance, by integrating the governor and servomotor to a single unit disposed in proximity to the prime mover, the admission valve being located more closely to the prime mover than shown in Fig. 1. However, the present manner of illustration has been chosen because it represents these essential devices side by side and thereby facilitates understanding the construction and operation of the system.

The prime mover consists of a steam turbine 101. The turbine shaft is denoted by 102, and the conduit for supplying steam to the turbine by 103. The steam supply is controlled by the admission valve V whose valve casing 104 has its inlet opening at 105. The valve disk 106 is mounted on a vertical valve stem 107. Raising or lowering the stem 107 has the effect of increasing or decreasing the rate of steam flow, and hence of controlling the speed of the turbine 101 accordingly.

A bevel gear 108 is mounted on the turbine shaft 102 and meshes with a bevel gear 109 of a vertical governor shaft 134 which serves also for driving a pump 111. The liquid supplied to the pump 111 through the inlet opening at 112 is impelled by the rotary pistons 113 and leaves the pump under pressure through the outlet at 114.

The governor G has an inlet conduit 121 to be supplied with operating fluid for the hydraulic control system. This conduit 121 may be connected to a pressure accumulator, for instance, fed from the outlet opening 114 of the pump 111 and thus is supplied with operating liquid, such as oil, under constant pressure. The housing 122 of the governor as well as the pump 111 are mounted on a structure 110. The governor housing 122 encloses a suspended body 123 which has an axial bore in alignment with the governor shaft 134. A tubular plug 124 is arranged in the axial bore of body 123 with a close sliding fit. The plug 124 is displaceable along the bore and is coupled by an eccentric with a worm gear 125 meshing with a worm shaft 126 which traverses the housing 122 and can be operated from the outside. Turning the worm shaft 126 has the effect of rotating the gear 125 and its appertaining eccentric so as to raise or lower the tubular plug 124. This permits adjusting and regulating the control function of the governor and hence the datum speed of the turbine, as will be understood from the following.

A cup-shaped valve body 127 is arranged within the axial bore of body 123 in order to control the lower opening of the plug 124. A plunger 128 carrying the cup 127 is guided with a close sliding fit in the bore of body 123 and provided with a suspended stem 129. The stem engages the central portion of a leaf spring 130 which carries two flyweights 131 and 132. The central portion of the leaf spring is bent towards the stem 129, while the ends of the spring are mounted on a drum structure 133. This structure is firmly secured to the governor shaft 134 and hence is rotated by the bevel gear 109 in a fixed proportion to the speed of the turbine shaft 102. The above-mentioned inlet conduit 121 opens into a duct 141 which communicates with a pressure chamber 143 above the tubular plug 124 through a metering orifice 142. The chamber 143 is also in communication with an outlet conduit 145 through a duct 144. When the control system is in operation, the oil supplied through inlet conduit 121 passes through the metering orifice 142 into chamber 143 and thence through duct 144 into the outlet conduit 145 to be transmitted to the servomotors. The bore of plug 124 forms a bypass to the just-mentioned hydraulic path and permits part of the oil supplied to chamber 143 to escape through the cup valve and an escape duct 135 to the oil sump. Consequently, when the cup valve 127 is in raised position, relatively little oil will escape from chamber 143 so that the hydraulic pressure transmitted through duct 144 into the conduit 145 is relatively high. On the other hand, if cup 127 is lowered, the escape opening between the cup and the lower end of the tubular plug 124 will be larger so that a larger amount of oil escapes through duct 135, while a proportionately smaller quantity of oil per unit of time is transferred into the outlet duct 145. Thus, the plug and cup valve mechanism act as a transformer relay.

When the turbine operates at low speed, the upper ends of the flyweights 131 and 132 lie closer to the governor shaft than at high speed so that the central portion of the leaf spring is in low position. The plunger 128 and the cup 127 of the transformer relay are then also in lower position so that the oil pressure transmitted to the servomotor is at a correspondingly low value. When the speed of the turbine increases, the centrifugal force acting on the flyweights forces their upper ends apart and causes the leaf spring 130 to raise its central portion, thereby lifting the plunger 128 and the valve cup 127. As a result, the pressure transmitted to conduit 145 is increased. Since the cross-section of the valve opening controlled by cup 127 depends on its distance from plug 124, the above-mentioned operation of worm shaft 126 permits adjusting and changing the datum value of the pressure transmitted at a given speed of the engine. This, in turn, has the effect of regulating the speed of the turbine to be kept constant by the action of the speed governor, as will be more fully understood from the following.

The outlet conduit 145 of the speed governor G is connected through the accelerator A with the inlet conduit 146 of a pilot valve forming part of the servomotor S. The servomotor S comprises a cylinder 151 which contains a piston 152 mounted on the stem 107 of the admission valve. A spring 153 is provided for balancing the weight of the elements connected with the piston 152. The upper and lower portions of the cylinder space containing the piston 152 communicate with corresponding ducts of a pilot valve. The valve piston 154 having suitable lands for controlling the admission and discharge of motor fluid to and from the servomotor cylinder proper, is arranged in cooperative relation to two inlet ducts 161 and 162 and an outlet duct 163. The inlet ducts 161 and 162 are connected with a suitable source of hydraulic pressure, for instance, the above-mentioned accumulator for supplying oil under constant pressure. The outlet conduit 163 may lead to the oil sump. When the valve piston 154 is in raised position, its lower land closes the inlet duct 162 while the upper duct 161 is in communication with the cylinder space above the servomotor piston 152. At the same time, the lower cylinder space is in communication with the outlet duct 163. As a result, the pressure acting on the top surface of the piston 152 moves it in the downward direction, thereby causing valve disk 106 to move towards closing position. Conversely, when the pilot piston 154 is lowered, the inlet duct 161 is closed while inlet 162 is placed in communication with the cylinder space below the servomotor piston 152. At the same time, the upper cylinder space is connected with the outlet duct 163. A raising force is now exerted on the servomotor piston with the effect of moving the valve disk 106 of the admission valve towards opening position.

The lower end of the pilot piston 154 rests against an abutment 165, a spring 164 being provided at the upper end of the piston 154 to maintain the engagement. The abutment 165 is carried by a bellows 166 whose inner space is sealed by means of another bellows 167. The annular space between the two bellows is connected with the inlet conduit 146.

When the pressure of the fluid supplied through conduit 146 from the speed governor G increases, the bellows expand and move the abutment 165 and the pilot piston 154 into the upper position. Since this causes the admission valve to move towards closed position, the admission of steam to the engine is throttled, thereby reducing the engine speed and hence the cause of the increased governor pressure acting in conduit 146. When the engine speed drops below the datum value, the reduced governor pressure transmitted through conduit 146 causes the bellows 166 and 167 to contract, thereby lowering the pilot piston 163. This, in turn, connects the lower piston side of the servomotor to the pressure supply and thus causes the piston 152 to move the admission valve into a more fully open position. The rate of steam supply to the engine is increased accordingly so that the engine speeds up and causes the speed governor to increase the pressure transmitted through conduit 146 to the pilot mechanism of the servomotor.

In both cases of operation, when the speed is restored to its datum value, a follow-up device forming part of the servomotor S serves to place the pilot piston 163 back into the illustrated inoperative position. The follow-up device includes a connecting stem 168 which is attached to the abutment 165 and helds one end of a spring 169. The other end of this spring is attached to a stem 170 which is journalled to a lever 171 fulcrumed at 172, the fulcrum being in fixed relation to the cylinder casing 151 of the servomotor. The valve stem 107 is connected with the lever 171 by a link 174 which is pivoted to the lever 171 at 173 and to the stem 107 at 175. When the turbine speed increases above the datum value, causing the pressure in conduit 146 to increase and to move the pilot piston 163 in the upward direction, the connecting stem 168 will move in the same direction against the force of the spring 169, while the lever 171 and the end of spring 169 at stem 170 remain at first in the original position. As soon as the changed adjustment of the pilot valve causes the servomotor piston 152 to move in the downward direction, the lever 171 is rotated in counterclockwise direction and moves the connecting stem 170 in the downward direction. Consequently, the tension of spring 169 is now increased. When the increasing tension reaches a point where it balances the bellows pressure acting on the abutment 165, the pilot piston 154 is returned into its original inactive position, and the further motion of the servomotor and admission valve are stopped. The position of the servomotor now remains fixed until the load again changes.

Reviewing briefly the just-mentioned control operations, it will be seen that the control system as a whole has the tendency of maintaining the prime mover at a constant speed, the datum value of this speed being adjustable by means of the displaceable plug 124 and its associated operating elements.

Figure 2:
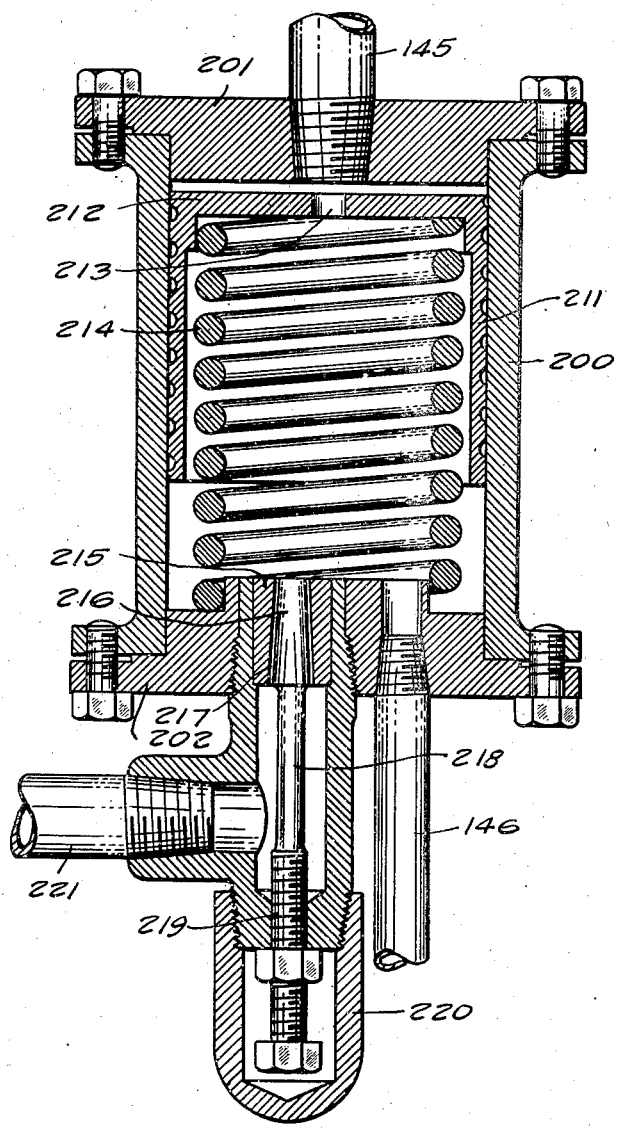
Fig. 2 is an axial section through one of the control devices and on larger scale than the corresponding view of the same device in Fig. 1.

Turning now to the construction and operation of the accelerating apparatus A, reference is had to Fig. 2 of the drawings. The apparatus has a cylindrical vessel 200 sealed at both ends by cover plates 201 and 202, respectively. A piston 211 is displaceable within the vessel 200 and engages its inner cylindrical wall by a close sliding fit. The piston forms a partition 212 with one or several orifices 213 which establish a communication between the cylinder spaces at both sides of the partition. A spring 214 is provided tending to force the piston 211 towards the cover plate 201. The inlet conduit 145 traverses the plate 201 so that the cylinder space on the corresponding side of the partition 212 communicates with the hydraulic conduit system of the speed governor. The conduit 145 leading to the pilot valve of the servomotor is attached to the cover plate 201. The cover plate 202 is traversed by an escape arrangement which comprises a tubular member 215 in fixed connection with the cover plate 202, and a central plug member 216 carried by a stem 218 which is threaded at 219 in order to adjust its axial position relative to the tubular member 215. The plug member 216 and the bore of tubular member 215 are of conical shape so that a displacement of the stem 218 changes the effective cross-section of the annular orifice formed between the tubular member 215 and the plug member 216. The threaded end 219 and the appertaining adjusting nut are protected by a removable cover 220. A drain pipe 221 is provided to carry off the hydraulic fluid escaping through the annular orifice. The pipe 221 may lead to the oil sump of the governor system.

When the system operates under steady speed conditions, the pressure transmitted through conduit 145 is transferred through the orifice 213 to the conduit 146 leading to the pilot valve of the servomotor with a given amount of pressure relief effective in the escape arrangement of the accelerator. The orifice 213 and the spring 214 are so dimensioned that the average force on the piston corresponding to the steady state of pressure drop through the orifice 213 is balanced by the biasing spring 214. Hence, the governor controlled pressure is reduced in value by an amount depending on the ratio of the two orifices 213 and 217 of the anticipator. This reduced pressure is applied through conduit 146 to the pilot bellows 166.

During rapid changes in speed, however, the sudden change in the pressure transmitted from the transformer relay causes a displacement of the anticipator piston 211 to a new position of equilibrium against its biasing spring 214. The velocity of the anticipator piston is then proportional to the rate of change of the transformer pressure, which rate is proportional to the rate of change of the turbine speed. The transient flow into or out of the pilot bellows is thus augmented by the change in flow due to the volumetric displacement rate of the anticipator piston, causing the pressure in the pilot bellows to depend on turbine acceleration as well as on speed.

The time of anticipation is approximately equal to the product of the flow impedance of the piston orifice and the capacitance of the piston biasing spring. The spring biased piston may also serve as a mechanical cylinder of pressure pulsations from the transformer pressure, by loading the piston with mass to make its natural frequency lower than the pulsation frequency. The piston and orifice type of anticipator may also be interposed between the reverse flow speed sensing impeller and the transformer. This affords delaying the anticipation by the transformer time constant.

It will be understood that while the above described anticipator contains a movable piston within a cylinder, another type of expansible vessel such as a bellows arrangement similar to the bellows of the follow-up mechanism may be used instead.

While the acceleration responsive control performed by the above-described form of the invention reacts to changes in the rate of flow or pressure in the hydraulic fluid system of the governor arrangement, a more direct way of control, also in accordance with the invention, can be obtained by rendering the control effect immediately responsive to changes in the speed of the prime mover itself or of a machine element coupled with the prime mover so as to rotate at a proportional speed. The embodiment illustrated in Figs. 3 and 4 is of a latter type.

Figs. 3 and 4 refer to an acceleration responsive governor to be used in a turbine control system substantially in the place of the speed governor G shown in Fig. 1. Hence, the relation of the apparatus illustrated in Fig. 3 to a complete control system will be more easily understood from a brief comparison of some of the elements shown in Fig. 3 with the corresponding parts of the control system shown in Fig. 1.

The apparatus according to Fig. 3 has a vertical operating shaft 334 which corresponds to the governor shaft 134 in Fig. 1. That is, the shaft 334 is coupled with the engine shaft so as to rotate at a proportional speed. Firmly attached to the vertical shaft 334 is a drum structure 333 analogous to the drum structure 133 of the governor shown in Fig. 1. The drum structure 333 carries two studs 336 and 337 for holding a leaf spring 330 which carries two flyweights 331 and 332, similar to the leaf spring 130 and flyweights 131 and 132 of the embodiment previously described.

The governing apparatus represented by Fig. 3 contains also a plug member 324 which is displaceable in the vertical direction by control means (not illustrated) similar to the plug 124 and its control means 125 and 126 shown in Fig. 1. A valve cup 327 provided on a plate 384 forms an annular interstitial orifice with the lower end of the plug member 324. The valve plate 384 is biased by a spring 383 holding it against the upwardly bent portion in the central part of the leaf spring 330. When the governor shaft 334 is in rotation, the centrifugal force acting on the flyweights 331 and 332 causes the plate 384 and the valve cup 327 to move in the upward direction towards the plug member 324. The plug member 324 has a bore 341 which forms an inlet duct for the hydraulic operating fluid comparable to the duct 144 of the arrangement shown in Fig. 1. A pressure chamber 343 within the plug member 324 is in communication with the inlet duct 341 and also, through an annular metering orifice 342, with an outlet duct 344 which has a function similar to the duct 144 in Fig. 1, i. e., serves to connect the pressure transformer for the governing apparatus with the pilot valve of the servomotor.

When in operation, an operating fluid of constant pressure is supplied through duct 341. Part of the pressure is effective in the outlet duct 344 and hence transmitted to the servomotor. The outlet pressure is reduced in accordance with the ratio of the fixed metering orifice 342 to the valve-controlled escape orifice between cup 327 and plug member 324. Since the escape orifice is controlled by the centrifugal governor action, the transformed pressure transmitted to the servomotor is dependent upon the governor speed in substantially the same manner as in the speed governor of the first-described embodiment, despite the fact that the effect is obtained with a differently constructed governing apparatus. The upper end of the biasing spring 383 rests against an abutment 382 which is firmly secured to the drum structure 333 or forms an integral part thereof. That is, the abutment 382 rotates together with the drum structure 333 and the governor shaft 334.

In accordance with the invention, the following constructive means are employed in the governing apparatus of Figs. 3 and 4 for rendering the control operation responsive to acceleration in turbine speed.

A body 380 is firmly attached to the drum structure 333 so as to rotate together with the structure and the parts of the speed governor attached thereto. A flywheel 386 is mounted on a shaft formed by body 380, with roller bearings 385 interposed in order to permit relative rotational movements between the flywheel 386 and the rotating governor structure. A stud 381 extending in parallel to the axis of rotation is secured to the body 380 and traverses a bore of the flywheel 386. The cross-section of the bore is larger than that of the stud so that the relative angular motion of the flywheel is limited by the extent of play between stud and bore. 387 denotes an expansible bellows, and 388 a tubular member connecting the interior of the bellows with the pressure chamber 343 of the plug member 324. The bellows and tubular member are arranged coaxially with the plug member and the governor shaft. The shaft portion of body 380 has an axial bore in communication with an opening 392 of the stud 381. The upper end of bore 391 has an escape opening 392 controlled by a spring biased cup valve 393. This valve is mounted on a stud 394 which is firmly attached to the flywheel 386 (see Fig. 4). The elements 388 and 387 and bores 390 and 391 form an acceleration liquid pressure space in which the liquid pressure depends upon acceleration for the reason that such space is supplied with liquid from the supply space 341 through the metering orifice 370a formed in the insert or plug 370 and liquid escapes from such space through the escape orifice provided by the cup valve 393 cooperating with the escape opening or port 392 and whose escape area depends upon acceleration, as will be immediately pointed out.

A spring 395 has one end attached to a stud 396 carried by the flywheel 386, while its other end is connected to the drum structure 333 or any of the parts rigidly mounted thereon. The spring 395 serves to keep the lug 381 pressed against the valve cup 393. The amount of spring pressure thus exerted determines the average pressure that is maintained within the bellows 387 for zero acceleration. The pressure in bellows 387 has the tendency to force the tubular member 388 and the central portion of the leaf spring 330 together with the valve plate 384 and its cup member 327 in the upward direction.

When the turbine operates at constant speed, the cup valve 327 of the relay transformer maintains a given position relative to the plug member 324. This position is determined by the centrifugal force and hence by the speed of the turbine, as well as by the pressure produced within the bellows 387 by the motive fluid escaping through the by-pass. At such steady operation, the flywheel 386 has no cause to rotate relative to the drum structure 333 so that the force of spring 395 maintains the flywheel pressed towards the lug 394 (Fig. 4).

Let us now assume that the turbine speed accelerates upward. Then the inertia of the flywheel 386 will cause the flywheel to lag behind the drum structure 333. The relative motion between the flywheel and the stud 381 acts against the biasing force of spring 395 and causes the cup valve 393 to reduce the escape orifice 392. In consequence, the pressure within the bellows 387 is increased by an amount equal to the force required for accelerating the flywheel divided by the area of the discharge orifice controlled by the cup valve 393. The increased pressure in bellows 387 has the tendency of moving the valve cup 327 towards the plug member 324. For a downward acceleration of the turbine speed, the pressure in the anticipator bellows 387 is correspondingly decreased as the discharge opening at valve 393 is opened.

The function of the flywheel controlled bypass thus is to apply a governing force to the cup valve of the main relay transformer that is proportional to the acceleration of the turbine. This acceleration response produces a change in the cup valve position before a similar change would be produced if the control effect were only due to a change in speed. Hence, the basic function of the apparatus is an anticipation of the speed control which would be effected without the application of the acceleration responsive elements of the governing apparatus.

From the structure described in connection with Figs. 3 and 4, it will be apparent that, with liquid maintained under pressure in the space 343, liquid will flow from the latter through the metering orifice 342 to the controlling liquid pressure space including the duct 344 and through the metering orifice 370a to the acceleration pressure space including the passages 390 and 391. As long as the velocity remains uniform, the cup valve 327 is positioned with the forces, including centrifugal force, acting thereon in equilibrium; however, with change in velocity, the pressure in the acceleration pressure space changes dependent upon acceleration in consequence of which the force due to the acceleration space pressure and applied to the valve 327 changes to bring about change in controlling liquid pressure which anticipates the velocity change.

When using a governing apparatus according to Figs. 3 and 4, the outlet duct 344 is as a rule directly connected to the pilot piston of the servomotor or to the follow-up bellows of the servomotor similar to the showing of Fig. 1 and without interposing the alternative form of the anticipator illustrated in Figs. 1 and 2. However, it is also possible to use both types of anticipating control apparatus in the same hydraulic control system.

When constructing acceleration responsive anticipators, as described in the foregoing, it should be considered that the action of such apparatus involves also a certain amount of time delay. For instance, there are two component delays associated with the functioning of an anticipator of the type illustrated in Figs. 3 and 4, and this delay must be small as compared to the delay in the transformer relay in order that the anticipatory effect is not lost. One component delay arises from the necessity of supplying oil to the anticipator bellows 387 as its volume changes in the course of a displacement of the cup valve 327, while the other component delay is the time required for the flywheel 386 to move from one position to another as it restricts the oil flow from the discharge orifice during acceleration.

However, the design of an anticipator according to the invention is not critical and can more readily be chosen and adjusted to delays below those of the speed responsive governor and servomotor without the aforementioned difficulties, in particular the hunting tendency incurred when attempting a direct increase in the speed of response of a speed governor. A delay in acceleration responsive control of only one-fourth and less of that of the speed-responsive transformer can be obtained without difficulty.

For instance, with a governing apparatus of the type shown in Figs. 3 and 4, and in the case of a transformer delay of 0.05 sec. and a servomotor delay of 0.77 sec., a time delay of 0.01 sec. in the anticipator can be obtained with an average pressure of 50 lbs./sq. in. in the anticipator bellows 387 and a flow of about 5.3 gals. per min. through the discharge orifice 392. This delay is negligible in comparison with the transformer delay as regards its effect on the stability of the speed control of a turbogenerator. The flywheel delay is represented by the time required for the flywheel to move into the position in which it will maintain a transformer pressure sufficient to close the turbine valve when the turbine is subjected to full torque acceleration. In the example just mentioned, this delay can be kept at about 0.016 sec. which is also sufficiently small to be neglected for stability purposes. The damping of the acceleration responsive control mechanism remains substantially constant over a large range of load variations.

In summary, a control system of the type described affords an extremely high degree of stability by virtue of the accelerating function of the anticipating control mechanism.

We claim as our invention:

In a governing system for controlling the admission of motive fluid to a prime mover in response to pressure of controlling liquid, means providing a first space in which liquid under pressure is maintained and a second space for the controlling liquid; means for maintaining controlling liquid under pressure in said second space; said last-named means including a metering orifice for supplying liquid thereto from the first space, an escape port for the second space, and a control valve cooperating with the discharge end of the port to define an escape orifice; said valve presenting an area exposed to pressure of said second space so that force dependent on such pressure is applied thereto; means providing a force which varies in response to speed and for directly applying the second-mentioned force to the control valve; means providing a third space; means for maintaining a liquid under pressure in the third space including a metering orifice for supplying liquid thereto from said first space, an escape port for the third space and formed in a rotating part, an inertia member journaled on the rotating part and provided with a valve element cooperating with the discharge end of the port to define an escape orifice, and a spring coupling the rotating part and the inertia member and exerting torque on the latter opposing torque exerted thereon and due to the force of liquid pressure applied to the area of the valve element exposed to pressure in the third space; and means responsive to pressure in said third space for applying force to said control valve.

CLINTON R. HANNA.
STANLEY J. MIKINA.